United States Patent [19]
Riegger et al.

[11] Patent Number: 4,901,014
[45] Date of Patent: Feb. 13, 1990

[54] ELASTIC BEARING ARRANGEMENT FOR ROTATIONAL SIGNAL GENERATOR

[75] Inventors: Johannes Riegger, Wurmlingen, Fed. Rep. of Germany; Walter Blöchle, Beamsville, Canada

[73] Assignee: Hohner Elektrotechnik KG, Fed. Rep. of Germany

[21] Appl. No.: 228,103

[22] Filed: Aug. 4, 1988

[51] Int. Cl.$^4$ ............................................. G01P 3/48
[52] U.S. Cl. ................................. 324/166; 310/40 R; 248/638; 361/236; 384/535; 384/536; 384/537; 324/207.25
[58] Field of Search ............... 324/160, 163, 166, 167, 324/168–175, 207, 208, 260, 262; 310/90, 91, 40 R, 43; 384/535, 536, 537, 542; 403/225, 292, 380; 361/236, 240; 248/638

[56] References Cited

U.S. PATENT DOCUMENTS

| | | | |
|---|---|---|---|
| 3,221,193 | 11/1965 | Kober | 384/542 X |
| 3,415,500 | 12/1968 | Pethis | 384/536 X |
| 3,897,985 | 8/1975 | Davis et al. | 384/536 X |
| 4,696,587 | 9/1987 | Nishida et al. | 384/536 |
| 4,718,781 | 1/1988 | Gérard | 384/537 X |

FOREIGN PATENT DOCUMENTS

| | | | |
|---|---|---|---|
| 0248883 | 8/1987 | Fed. Rep. of Germany | 324/175 |
| 3693255 | 6/1988 | Fed. Rep. of Germany | 324/160 |
| 2245950 | 5/1975 | France | 324/175 |
| 52-075477 | 6/1977 | Japan | 324/175 |

Primary Examiner—Reinhard J. Eisenzopf
Assistant Examiner—Warren S. Edmonds
Attorney, Agent, or Firm—Barnes & Thornburg

[57] ABSTRACT

Known rotational signal generators for generating signals that correspond to the rotational speed and/or the angle of rotation of a rotatable component part may be connected with the rotatable component part, by means of a coupling or the like. This coupling results in higher space requirements and in an expensive assembly of the rotational signal generator. The rotational signal generator according to the invention is equipped with a hollow shaft and can be fitted onto the rotatable component part. For the compensation of misalignments or the like of the rotatable component part, the rotational signal generator is mounted elastically. The rotational signal generator may be used for measuring the rotational speed, for measuring the angle of rotation, for measuring the length and for similar operations in the fields of driving technology, systems construction, automatization technology and the like.

19 Claims, 3 Drawing Sheets

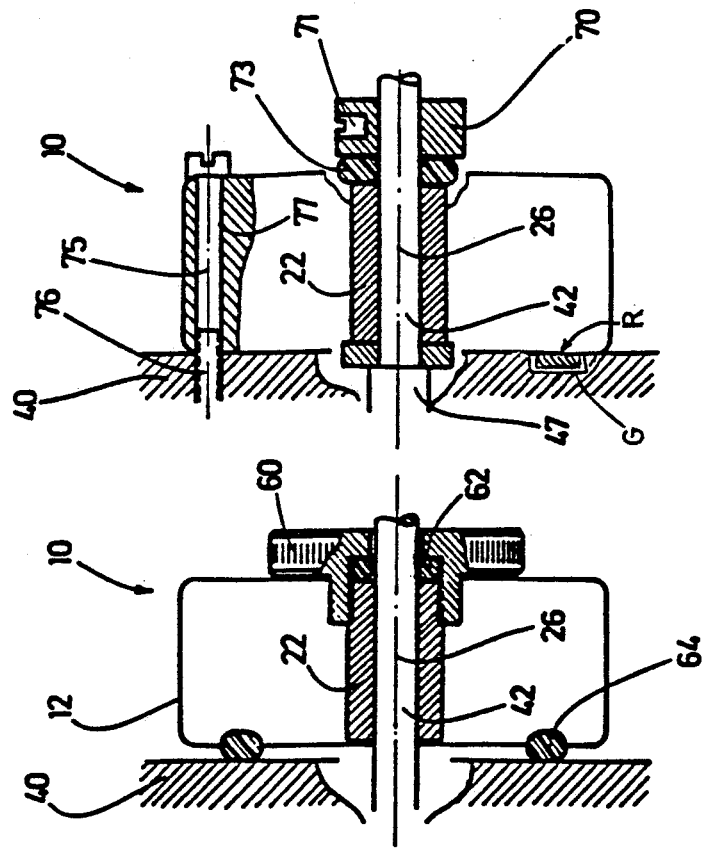
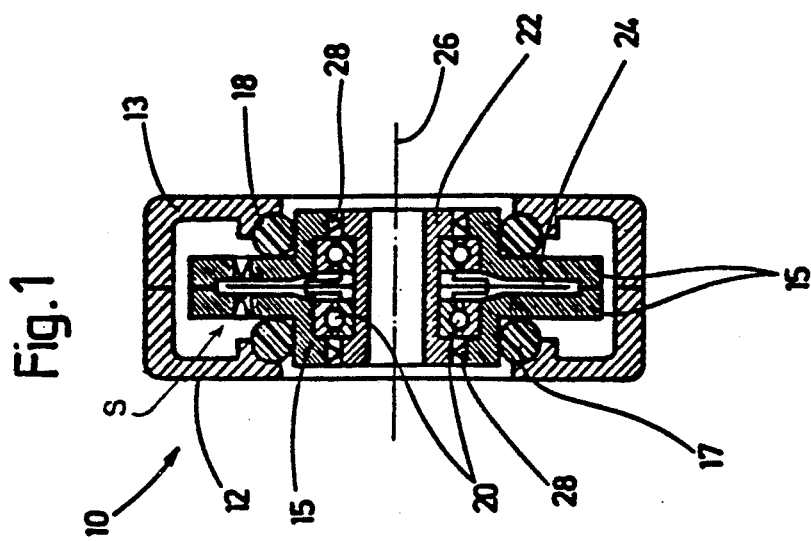
Fig. 6
Fig. 5
Fig. 1

ELASTIC BEARING ARRANGEMENT FOR ROTATIONAL SIGNAL GENERATOR

BACKGROUND AND SUMMARY OF THE INVENTION

The invention relates to a rotational signal generator for generating signals that correspond to the rotational speed and/or the angle of rotation of a rotatable component part such rotational signal generators contain a pulse disk that is rotatably arranged in a stationary bearing housing and can be non-rotatabLy connected with the rotatable component part. A signal generating device that is mounted at the bearing housing is provided which is assigned to the pulse disk and generates signals from the rotational movement of the pulse disk that correspond to the rotational speed and/or the angle of rotation of the rotatable component part.

In rotational signal generators of this type, the pulse disk is fixedly connected with a shaft which, in turn, is coupled with the rotatable component part via a coupling. This coupling is used for balancing misalignments between the rotational signal generator and the rotatable component part as well as for compensating temperature-caused changes of length of the rotatable component part. However, the coupling requires a large amount of space when the rotational signal generator is mounted as well as considerable expenditures when it is assembled.

It is an object of the invention to provide a rotational signal generator which is insensitive to misalignments, changes of length and the like and requires little space.

This object is achieved in that, in a rotational signal generator of the initially mentioned type, the pulse disk is carried by a hollow shaft that can be fitted onto the rotatable component part and is rotatably disposed in the bearing housing, and in that the bearing housing is held elastically in axial and radial direction.

No coupling is required anymore for the connection of the rotational signal generator with the rotatable component part, which significantly reduces the space required for the mounting of the rotational signal generator. The rotational signal generator is fitted onto the rotatable component part, whereby a simple and rapid assembly is achieved. A compensation of misalignments and the like takes place within the rotational signal generator by means of the elastic bearing.

According to certain especially preferred embodiments of the rotational signal generator constructed according to the invention, the bearing housing, with the insertion of at least one elastic element, is housed in a generator housing that can be stationarily fixed. The elastic element causes a float holding of the bearing housing. By means of the generator housing, particularly the pulse disk and the signal generating device are protected from dirt and other environmental influences.

In another further development of the rotational signal generator according to the invention, two O-rings are inserted between the generator housing and the bearing housing which are arranged at an axial distance to one another. In this manner, the elastic holding of the bearing housing in the generator and thus the possibility of a compensation of misalignments and the like housing is achieved in a simple way. In circumferential direction, a frictional connection is obtained between the bearing housing and the generator housing.

In an additional further development of the rotational signal generator according to the invention, the generator housing, for the fixing at a stationary motor casing or the like, is provided with a holding device which prevents at least a rotation of the generator housing around the axis formed by the hollow shaft. The generator housing is therefore arranged stationarily with respect to the rotating direction of the rotatable component part. A rotating of the rotational signal generator along with the rotatable component part is not possible.

In an additional further development of the rotational signal generator according to the invention, for the non-rotatable connection of the hollow shaft carrying the pulse disk with the rotatable component part, a clamping device is provided which connects the rotatable component part with the hollow shaft. By means of the clamping device, a non-rotatable connection is established between the rotatable component part and the pulse disk. A rotation of the rotatable component part is therefore transmitted directly to the pulse disk.

Other objects, advantages and novel features of the present invention will become apparent from the following detailed description of the invention when considered in conjunction with the accompanying drawings.

BRIEF DESCRIPTION OF THE DRAWINGS

FIG. 1 is an axial sectional view of a rotational spgnal generator constructed in accordance with preferred embodiments of the invention;

FIG. 5 is a schematic sectional view of a rotational signal generator corresponding to FIG. 1, in which a union nut is provided for the non-rotatable connection with a shaft; and FIG. 6 is a schematic sectional view of a rotational signal generator corresponding to FIG. 1, a clamping ring being provided for the non-rotatable connection with a shaft.

DETAILED DESCRIPTION OF THE DRAWINGS

Figure 2:
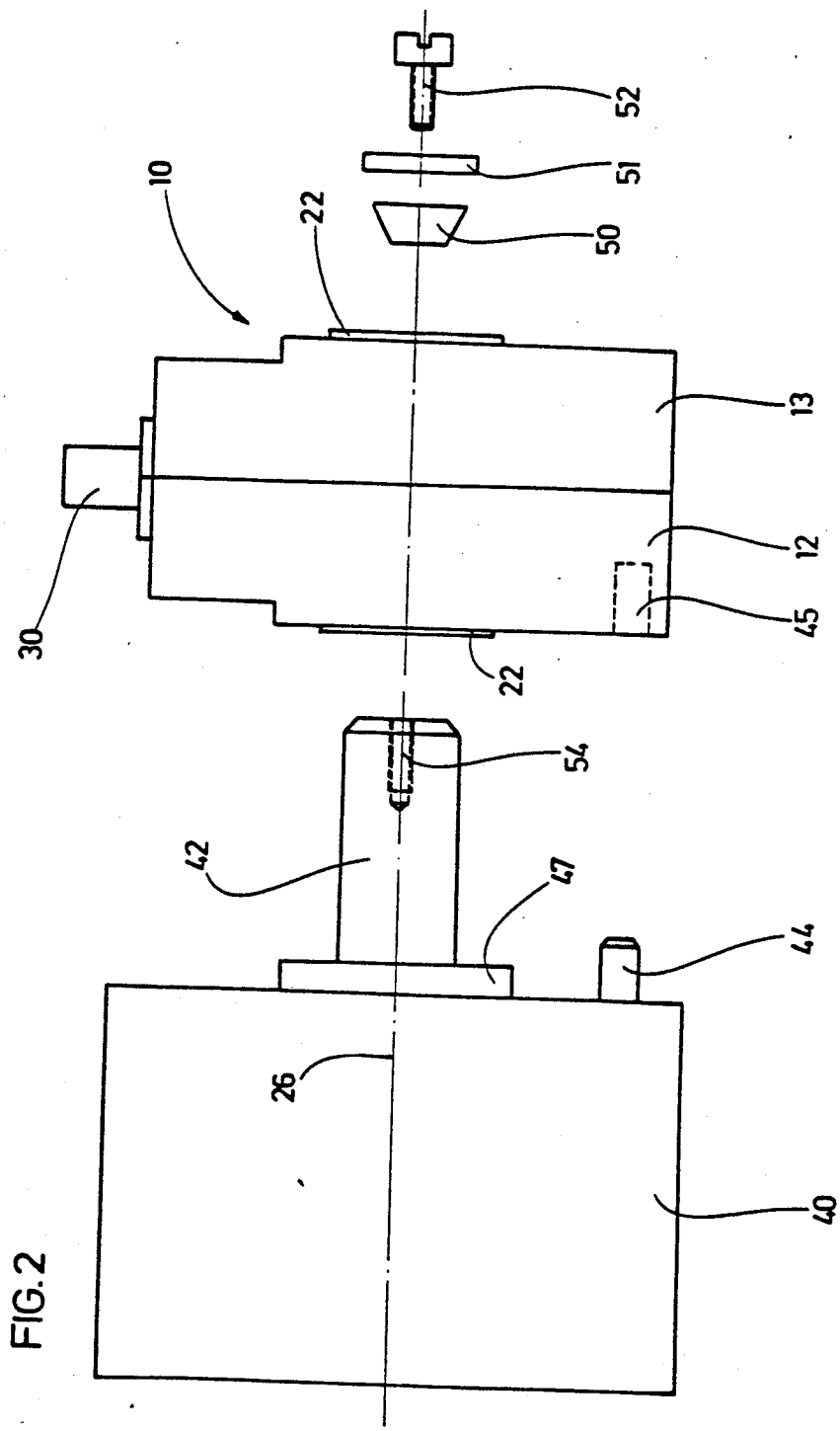
FIG. 2 is an exploded view of the rotational signal generator of FIG. 1, which is arranged on a shaft of an electric motor.

For controlling and regulating technical operations, such as manufacturing and assembling devices, it is often required to measure the movements of certain component parts. This may, for example, be the rotational speed of a shaft or the angle of rotation of a rotatable component part. By means of electric rotational signal generators, it is possible to precisely measure these movements.

Rotational signal generators of this type are equipped with a pulse disk which is subdivided into individual segments, which are alternately transparent and impervious to light. In the simplest case, the scanning of the segments takes place by means of light barriers, in which case, the individual light/dark phases are converted into electric signals. The electric rotational signal generator generates a certain number of pulses per rotation. By counting the puulses, it is possible to measure the angle of rotation around which a rotatable component part has rotated. When the number of pulses is applied to a time unit, the rotational speed of the rotatable structural component is obtained.

FIG. 1 shows a rotational signal generator 10 which is developed to be essentially rotationally symmetric with respect to its axis 26 of rotation. Two housing halves 12, 13 form a generator housing in which a two-part bearing housing 15, a hollow shaft 22 and a pulse disk 24 are housed.

The hollow shaft 22 is rotatably disposed in the bearing housing 15 by means of ball bearings 20. The pulse disk 24 is non-rotatably connected with the hollow shaft 22 and is disposed perpendicularly with respect to the axis 26 of rotation. The bearing housing 15 receives the pulse disk 24 between two radial flanges. Seals 28 are provided approximately at both ends of the hollow shaft 22 between this hollow shaft 22 and the bearing housing 15 and prevent dirt from entering into the ball bearings 20.

The bearing housing 15 forms a unit together with the ball bearings 20, the hollow shaft 22 and the pulse disk 24. The bearing housing 15 is arranged stationarily, and the hollow shaft 22 with the pulse disk 24, in the bearing housing 15, can be rotated around the axis 26 of rotation. This unit is elastically held in the generator housing by means of two rubber-elastic O-rings 17, 18. The two O-rings 17, 18 are arranged at an axial distance from one another and rest against the exterior sides of the two radial flanges of the bearing housing 15 as well as against the interior sides of the two housing halves 12, 13 of the generator housing. The O-rings 17, 18 have a Shore hardness of approximately 40 to 70. Overall, this means that the unit carried by the bearing housing 15 is fixed with respect to the axis 26 of rotation in rotating direction, but is held so that it floats in the generator housing with respect to the axis 26 of rotation in axial and radial direction.

At the bearing housing 15, a signal generating devices is mounted. It may, for example, consist of one or several light barriers which are interrupted by the segments of the disk 24 that are impervious to light. The electric pulses generated by the signal generating devicess when the pulse disk is rotated, are fed to a connecting plug 30 shown in FIGS. 2 and 3 via lines that are not shown. At this connecting plug 30, these signals that correspond to the rotational speed and/or the angle of rotation of the pulse disk 24 may be taken off for further processing.

As shown in FIG. 2, the rotational signal generator 10 can be fitted onto the shaft end of a drive shaft 42 of an electric motor 40. For this purpose, the outside diameter of the drive shaft 42 corresponds to the inside diameter of the hollow shaft 22.

The drive shaft 42 is provided with a step 47 against which the hollow shaft 22 supports itself in axial direction when the rotational signal generator 19 is fitted on. A stud bolt 44 that points in axial direction, at the electric motor 40, projects away from this electric motor 40 and, in the fitted-on condition, engages in a recess 45 of the rotational signal generator 10. In this manner, the generator housing and thus the rotational signal generator 10 are fixed with respect to a rotation around the axis 26 of rotation. A thread 54 that is coaxial with respect to the axis 26 of rotation is inserted into the free end of the drive shaft 42. In the fitted-on condition of the rotational signal generator 10, with the insertion of a driving element 50, such as an elastic clamping or spreading element, and a washer 51, a screw 52 is screwed into the thread 54. The driving element 50 is pressed against the front face of the free end of the drive shaft 42 and against the end of the hollow shaft 22. In this manner, a frictional connection is created between the drive shaft 42 and the hollow shaft 22 by means of the driving element 50. The rotating motion of the hollow shaft 22 and thus of the pulse disk 24 carried by it therefore corresponds exactly to a rotating motion of the drive shaft 42.

Figure 3:
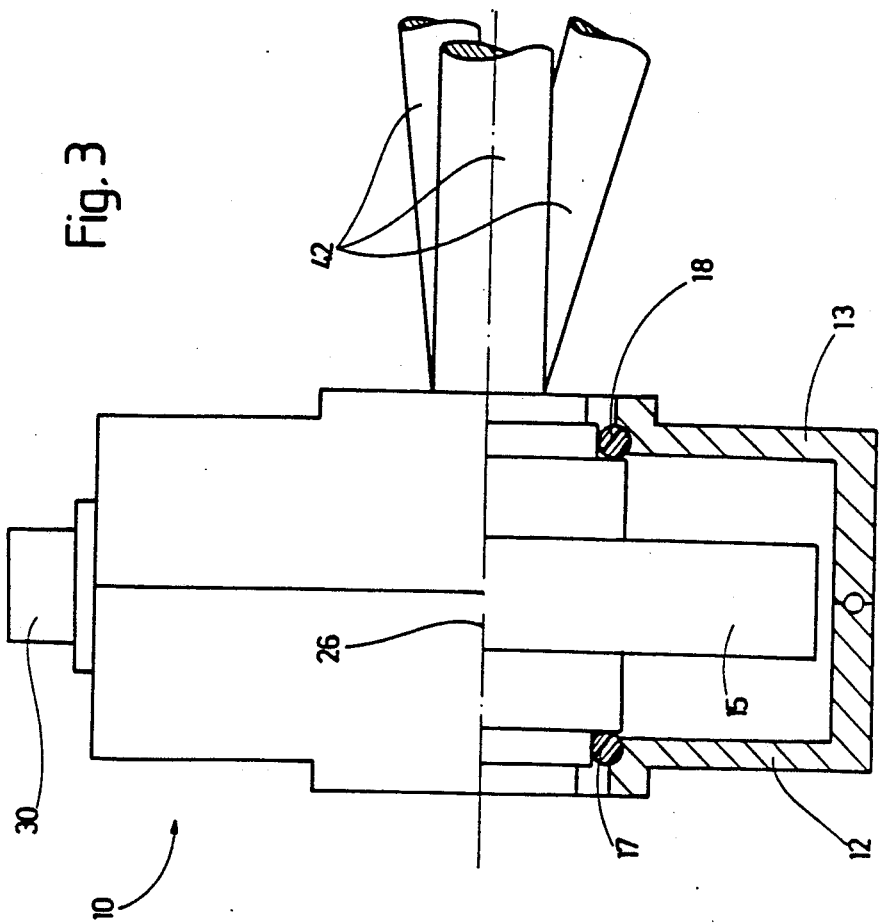
FIG. 3 is a part sectional cut view of the rotational signal generator of FIG. 1, which is arranged on a shaft which takes up various angular positions.

If the drive shaft 42 of the electric motor 40 has a run-out or the like, or if other misalignments exist between the electric motor 40 and the rotational signal generator 10, deviations of this type are compensated by the elastic holding of the unit carried by the bearing housing 15 in the generator housing. This is shown in FIG. 3. These compensating movements of the whole unit do not result in any measuring error because the pulse disk 24 and the signal generating device, which together generate the signals corresponding to the rotating movement of the drive shaft 42, are both held at the bearing housing 15. This is also applies to axial movements of the drive shaft 42 which may be the result, for example, of temperature-caused changes and which are then also compensated by the floating mounting of the whole unit carried by the bearing housing 15.

Figure 4:
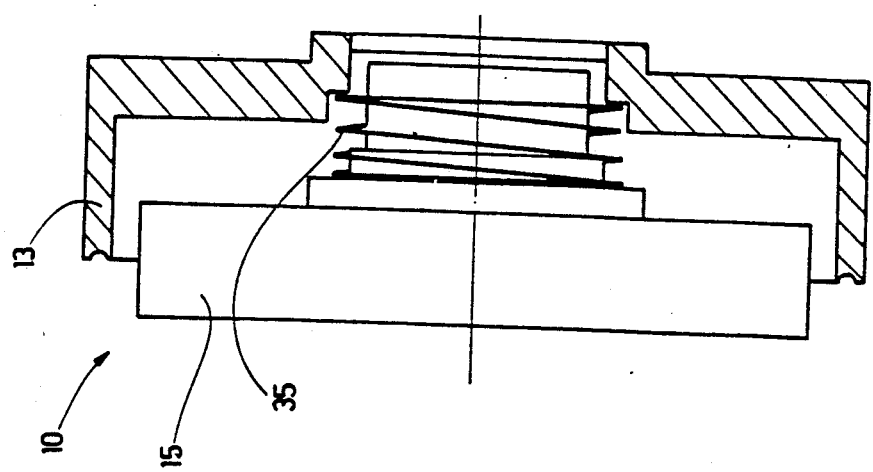
FIG. 4 is a part sectional cut view of a rotational signal generator transversely to its axis of rotation in which a spring is provided for the float bearing.

FIG. 4 shows another embodiment of an elastic holding of the bearing housing 15 in the generator housing formed by the housing halves 12, 13. There, a coil spring 35 is inserted between the bearing housing 15 and the housing half 13. The coil spring 35 surrounds the hollow shaft 22 at a distance on the outside and, with its ends, on one side, is fixed at the bearing housing 15 and, on the other side, at the generator housing 12, 13. It ensures a floating mounting of the bearing housing 15. The bearing housing 15, also on its side that is not shown, may be connected with the other housing half 12 by means of another coil spring according to certain preferred embodiments. It is also contemplated to use bellows or the like, instead of the coil spring 35 in certain preferred embodiments.

FIGS. 5 and 6 show other embodiments for fixing the generator housing at the motor casing 40 and for the non-rotatable connection of the pulse disk 24 with the drive shaft 42.

In FIG. 5, the hollow shaft 22 is equipped with an external thread onto which a union nut 60 is screwed. An O-ring 62 is inserted between the hollow shaft 22 and the union nut 60. This O-ring 62 rests against the hollow shaft 22, the drive shaft 42 and the union nut 60. By the screwing-on of the union nut 60, the O-ring 62 is braced against the mentioned component parts and, in this manner, forms a frictional connection between the hollow shaft 22 and the drive shaft 42. Any support of the other end of the hollow shaft 22 is not necessary.

In FIG. 5, on the front face of the generator housing facing the electric motor 40, an O-ring 64 is held at the housing half 12; it may, for example, be glued on. Because the O-ring 64 rests against the electric motor 40, the rotational signal generator 10 is fixed with respect to a rotation around the axis 26 of rotation. As a result of the explained frictional connection between the hollow shaft 22 and the drive shaft 42 by means of the O-ring 62, a shifting of the rotational signal generator 10 in axial direction is also prevented.

In FIG. 6, as an additional holding device for the fixing of the generator housing at the motor casing 40, a recess 77 is placed in the housing halves 12, 13 which is arranged approximately in parallel to the axis 26 of rotation and through which a screw 75 is fitted which is screwed into a thread 76 of the casing of the electric motor 40. For the fixing of the generator housing, a stop face may also be provided at its lateral surface area, a bolt fastened at the electric motor 40 resting against this stop face according to certain preferred embodiments.

As an additional clamping device for the non-rotatable connection of the hollow shaft 22 and the drive shaft 42, in FIG. 6, the drive shaft 42 is provided with a step 47 on which one end of the hollow shaft 22 supports itself in axial direction. An O-ring 73 rests against the other end of the hollow shaft 22, on the side of this O-ring 73 facing away from the hollow shaft 22, a clamping ring 70 being fitted onto the drive shaft 42. This clamping ring 70 is clamped, by means of a screw 71, onto the drive shaft 42 elastically deforming the O-ring 73, after it had been pressed on in the direction toward the hollow shaft 22. In this manner, via the O-ring 73, a frictional connection is created between the hollow shaft 22 and the drive shaft 42.

It is also contemplated to achieve the non-rotatable connection between the hollow shaft 22 and the drive shaft 42 by means of a press fit. It is also contemplated that, for the fixing of the rotational signal generator 10 at the motor casing, grooves and ribs are provided at the two mentioned component parts which engage in one another when the rotational signal generator 10 is fitted on. FIG. 6 schematically depicts such a groove G and rib R arrangement. The various features of the described embodiments may also be combined with one another according to other preferred contemplated embodiments of the invention.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A rotational signal generator for generating signals that correspond to the rotational speed and/or the angle of rotation of a rotatable component part, comprising:
    a generator housing,
    a bearing housing supported in the generator housing,
    a pulse disk that is rotatably arranged in the bearing housing and is non-rotatably connectable with the rotatable component part, and
    a signal generating device that is mounted at the bearing housing, is assigned to the pulse disk and generates signals from the rotational movement of the pulse disk that correspond to the rotational speed and/or the angle of rotation of the rotatable component part,
    wherein the pulse disk is carried by a hollow shaft that can be fitted onto the rotatable component part and is rotatably disposed in the bearing housing, and wherein the bearing housing is elastically held in axial and radial direction in the generator housing by elastic support means, said elastic support means being in direct contact with both the bearing housing and generator housing over a substantial portion of the circumference of the bearing housing.

2. A rotational signal generator according to claim 1, wherein said elastic support means includes a coil spring including windings surrounding the bearing housing.

3. A rotational signal generator according to claim 1, wherein the elastic support means includes two O-rings inserted between the generator housing and the bearing housing, said O-rings being arranged at an axial distance from one another.

4. A rotational signal generator according to claim 1, wherein the bearing housing is disposed in the generator housing by mans of at least one spring forming at least a portion of the elastic support means.

5. A rotational signal generator according to claim 1, wherein the generator housing, for the fixing at a stationary motor casing, is equipped with a holding device which prevents at least a rotation of the generator housing around the axis formed by the hollow shaft.

6. A rotational signal generator according to claim 5, wherein at least one recess for a bolt that is arranged approximately in parallel to the hollow shaft is placed in the generator housing.

7. A rotational signal generator according to claim 5, wherein at least one stop face for a bolt is provided at the lateral surface area of the generator housing.

8. A rotational signal generator according to claim 5, wherein at least one front face of the generator housing is provided with at least one detent means.

9. A rotational signal generator according to claim 5, wherein at least one front face of the generator housing is equipped with a friction element.

10. A rotational signal generator according to claim 1, wherein a clamping device is provided for the non-rotatable connection of the hollow shaft carrying the pulse disk with the rotatable component part.

11. A rotational signal generator according to claim 10, wherein one end of the hollow shaft is supported in axial direction, and the other end of the hollow shaft is frictionally connected with the rotatable component part via a friction element which by means of a clamping ring is pressed against the hollow shaft and the rotatable component part.

12. A rotational signal generator according to claim 10, wherein one end of the hollow shaft is frictionally connected with the rotatable component part via a friction element which, by means of a union nut screwed onto the hollow shaft, can be pressed against the hollow shaft and the rotatable component part.

13. A rotational signal generator according to claim 10, wherein one end of the hollow shaft is supported in axial direction, the hollow shaft is fitted onto a shaft end of the rotatable component part, and the other end of the hollow shaft, via a driving element which, by means of a screw which is screwed into the shaft end, is pressed against the hollow shaft and the shaft end, is frictionally connected with the rotatable component part.

14. A rotational signal generator according to claim 5, wherein the elastic support means includes two O-rings inserted between the generator housing and the bearing housing said O-rings being arranged at an axial distance from one another.

15. A rotational signal generator according to claim 5, wherein at least one recess for a bolt that is arranged approximately in parallel to the hollow shaft is placed in the generator housing to limit rotation of the generator housing.

16. A rotational signal generator according to claim 10, wherein the generator housing, for the fixing at a stationary motor casing, is equipped with a holding device which prevents at least a rotation of the generator housing around the axis formed by the hollow shaft.

17. A rotational signal generator according to claim 9, wherein the friction element is an elastic O-ring fixed at the front face of the generator housing around the axis of rotation.

18. A rotational signal generator according to claim 8, wherein the detent means includes rib means.

19. A rotational signal generator according to claim 18, wherein the detent means includes groove means engagable with the rib means.

* * * * *